July 25, 1933.  L. C. FORREST  1,919,783
CORN HARVESTER
Filed March 2, 1929   5 Sheets-Sheet 1

Inventor
Londell C. Forrest

By Clarence A. O'Brien
Attorney

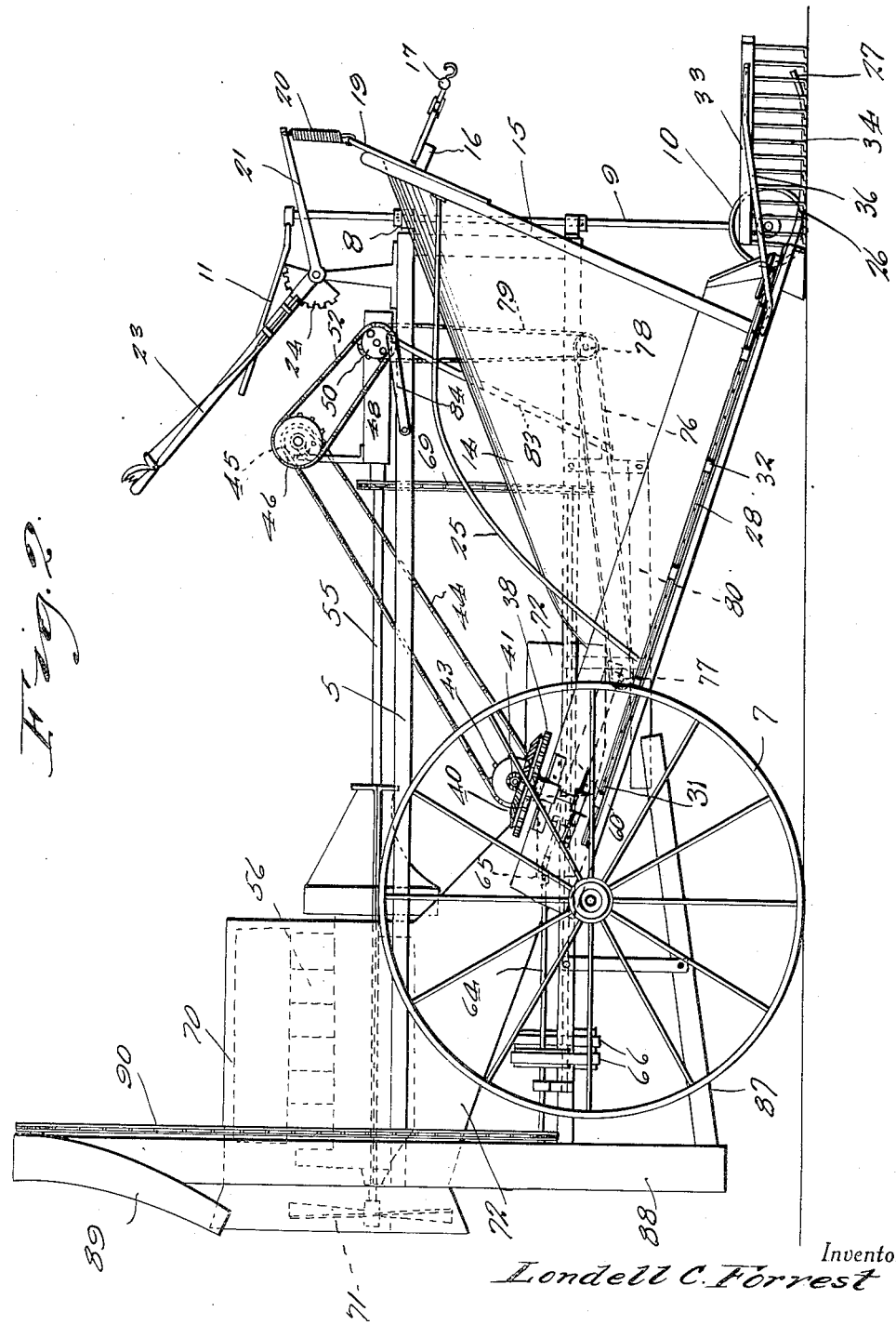

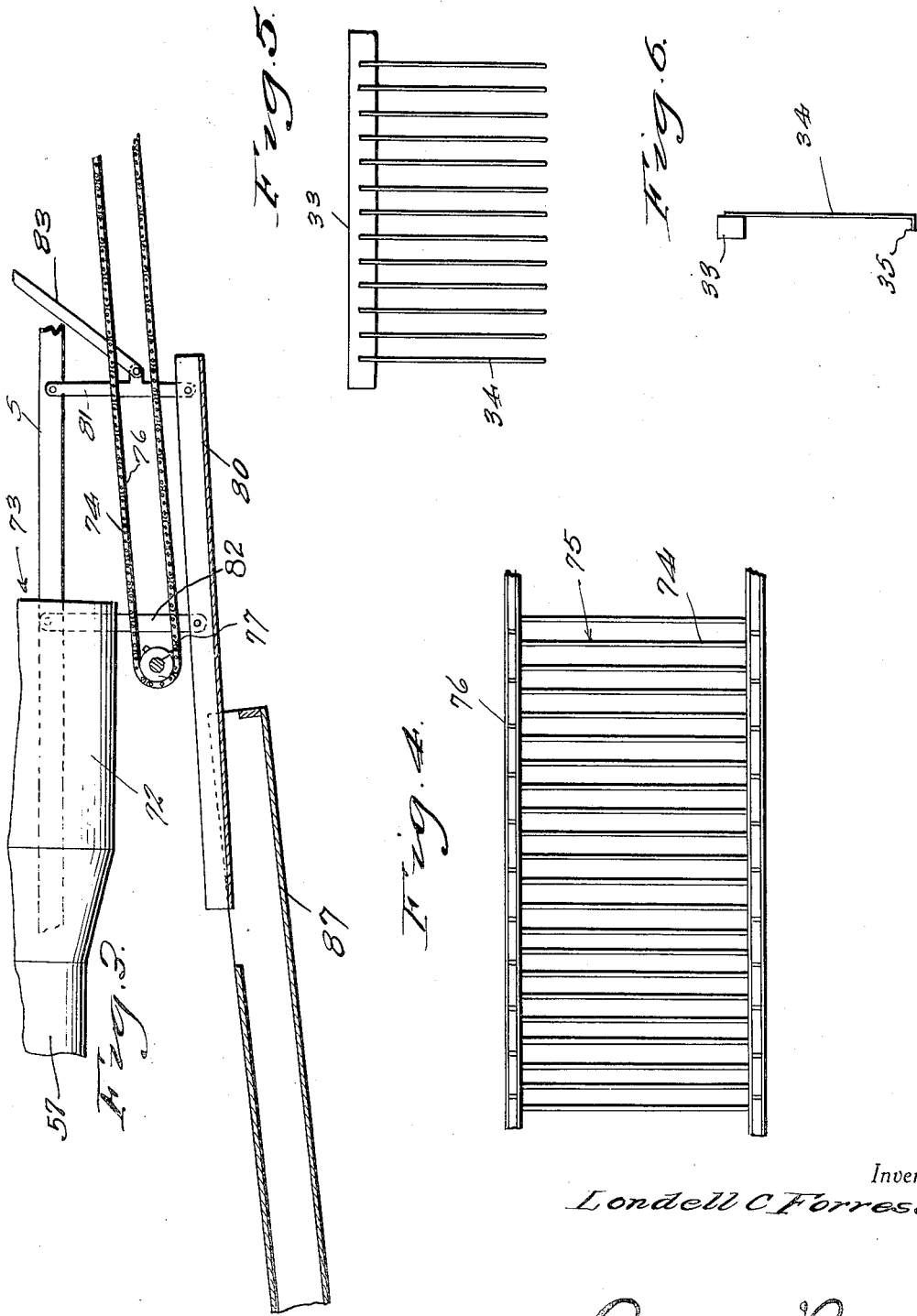

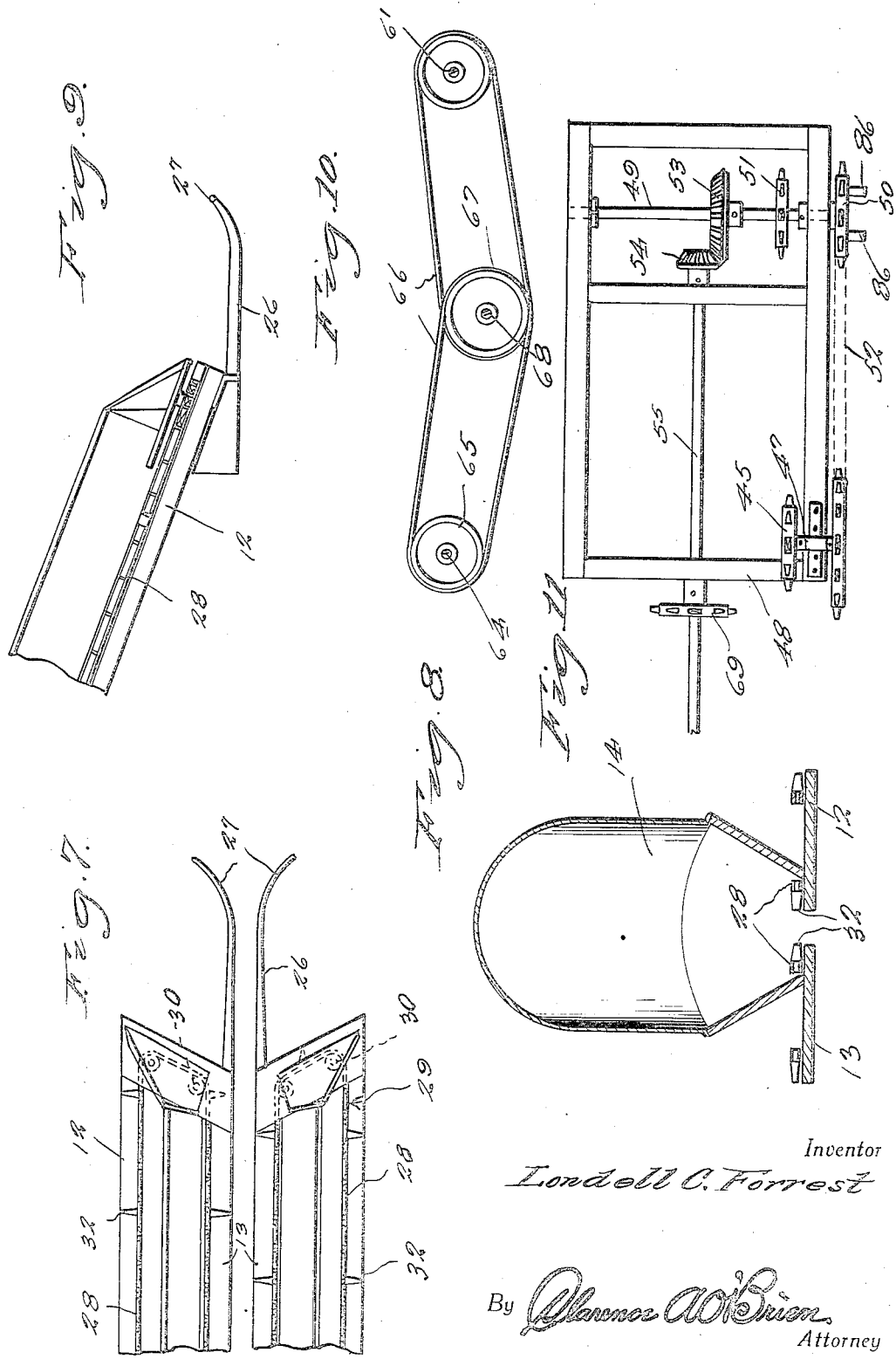

July 25, 1933.  L. C. FORREST  1,919,783
CORN HARVESTER
Filed March 2, 1929   5 Sheets-Sheet 5
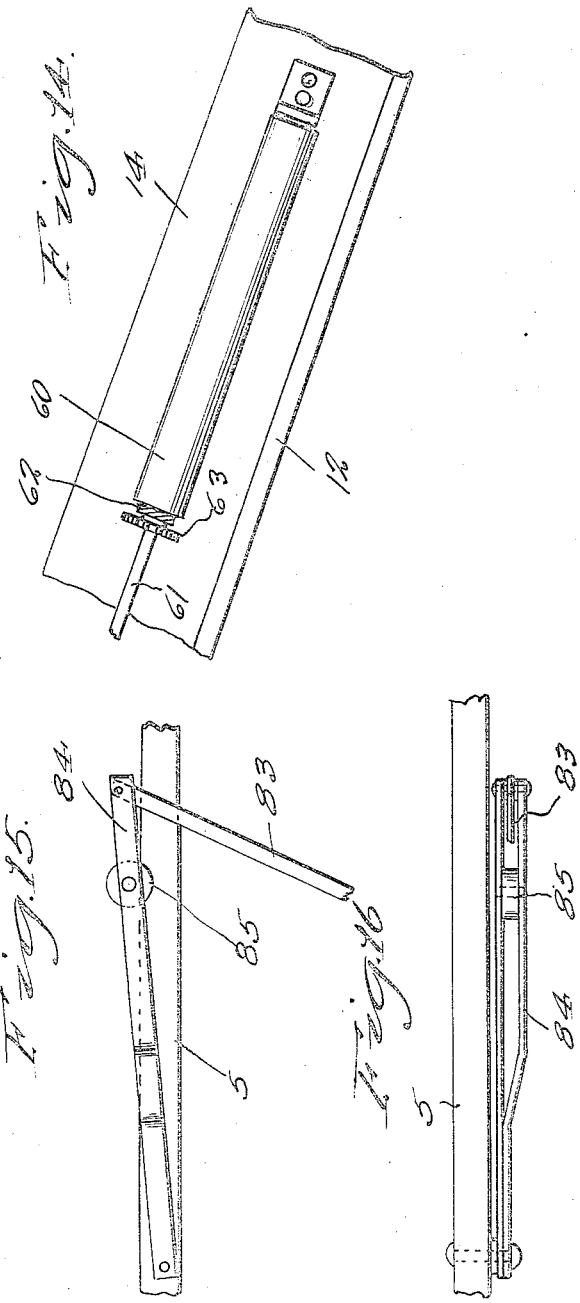
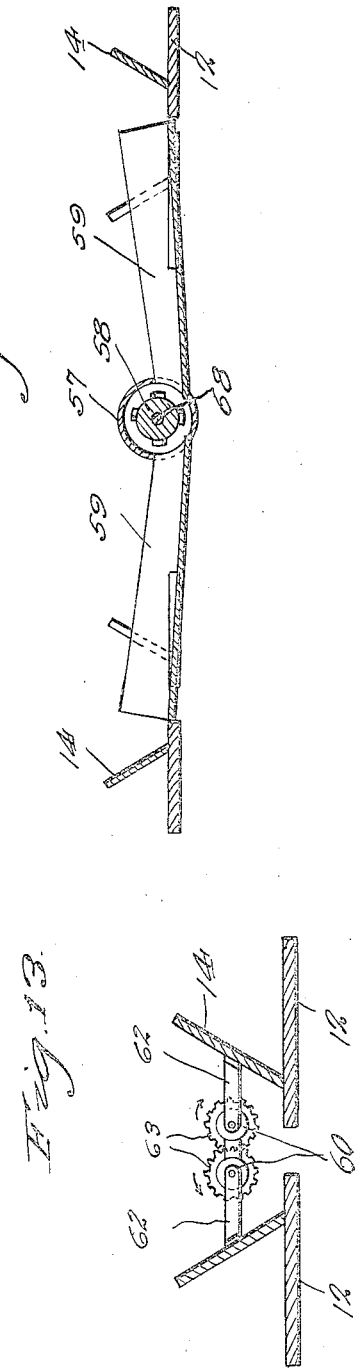
Inventor
Londell C. Forrest
By *Clarence A. O'Brien*
Attorney Patented July 25, 1933

1,919,783

UNITED STATES PATENT OFFICE

LONDELL CAMERON FORREST, OF KIT CARSON, COLORADO, ASSIGNOR, BY DIRECT AND MESNE ASSIGNMENTS, TO DEERE & COMPANY, OF MOLINE, ILLINOIS, A CORPORATION OF ILLINOIS

CORN HARVESTER

Application filed March 2, 1929. Serial No. 344,000.

The present invention relates to corn harvesters embodying means for gathering the corn ears from the stalk and also for shelling the corn from the cob and conveying the grain to the rear of the harvester for sacking or emptying into a vehicle travelling at the rear of the harvester.

Another object of the invention is to provide an apparatus of this character which is adapted to pick up loose ears of corn from the ground, for conveying to the shelling mechanism as well as to remove the ears from the stalk.

An additional object is to provide an apparatus of this character adapted for mounting upon a suitable vehicle for travelling over a field of corn and providing a motor mounted upon the vehicle for operating the conveying, gathering and shelling mechanisms of the invention.

Another object is to provide an apparatus of this character, of a simple and practical construction, which is efficient and reliable in performance, which is labor saving, and which eliminates all handling of the corn until the same has been shelled and delivered from the harvester, and which is otherwise well adapted for the purposes for which the same is intended.

Other objects of the invention will become apparent during the course of the following description.

In the drawings:

Figure 2 is a side elevational view.

Figure 3 is a fragmentary sectional view, taken substantially along the line 3—3 of Figure 1.

Figure 4 is a fragmentary plan view of the conveyor for the cobs and husks after the grain has been shelled therefrom.

Figure 5 is an elevational view of one of the rakes for the loose ears of corn lying upon the ground.

Figure 6 is an edge elevational view thereof.

Figure 7 is a top plan view of the forward end of the guide skid and conveyor for the loose ears of corn.

Figure 8 is a transverse sectional view through one of the feed panels for the stalks.

Figure 9 is a side elevational view of the guide skid and conveyor for the loose corn.

Figure 10 is a detail of the belt drive means for the conveyors at the opposite sides of the machine.

Figure 11 is a plan view of the power transmission means for the shaker screen and conveyors.

Figure 12 is a fragmentary transverse sectional view of the feed trough for feeding the ears of corn into the sheller mechanism.

Figure 13 is a transverse sectional view through a pair of the rollers provided for removing the ears of corn from the stalk and taken substantially along the line 13—13 of Figure 1.

Figure 14 is a fragmentary sectional view taken substantially along the line 14—14 of Figure 1, and illustrating one of said rollers in elevation.

Figure 15 is a detail of the rocker arm for the shaker screen and shown in elevation, and Figure 16 is a top plan view thereof.

Figure 1:
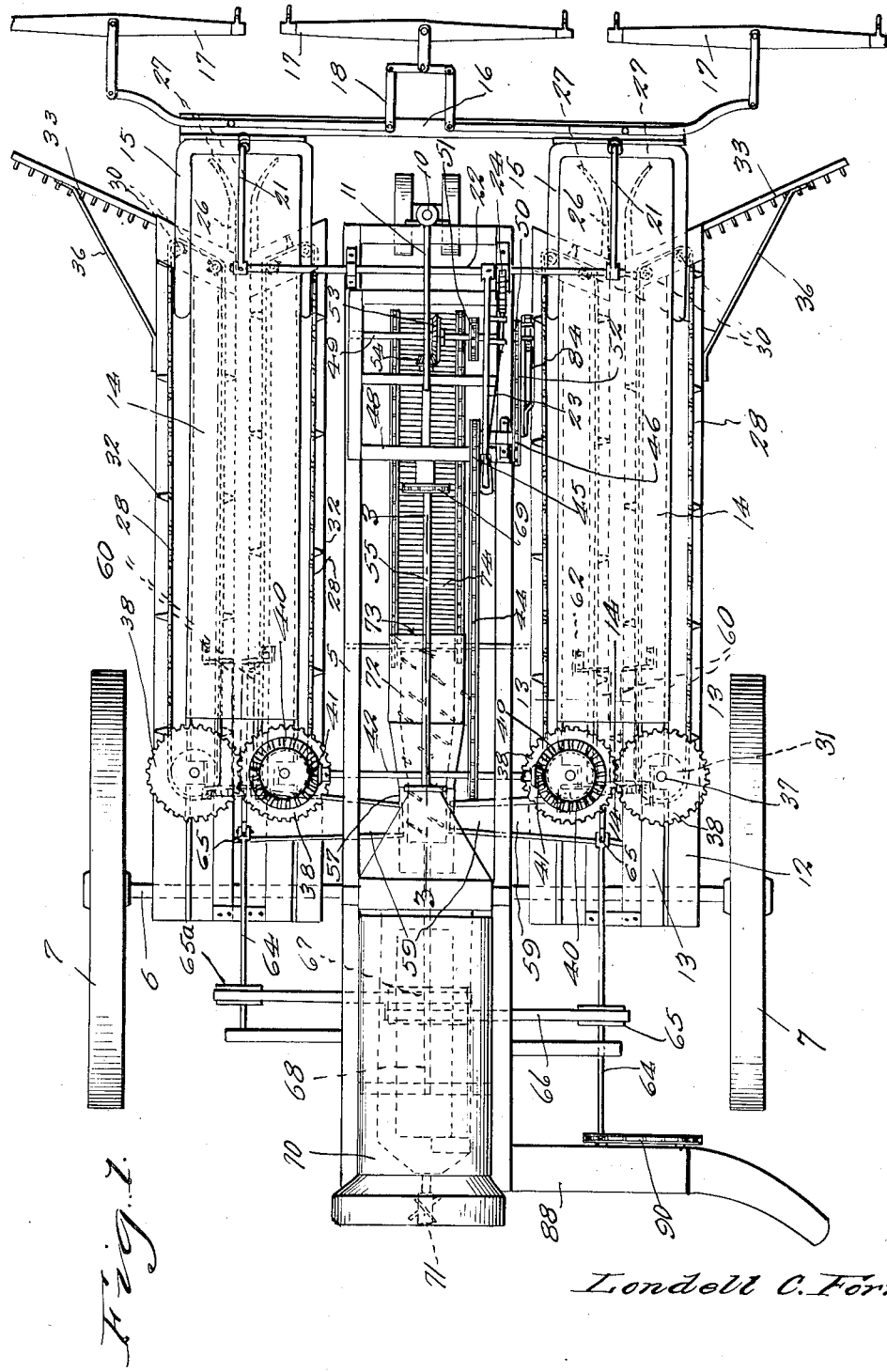
Figure 1 is a top plan view.

Referring now to the drawings in detail, wherein for the purpose of illustration I have disclosed a preferred embodiment of the invention, the numeral 5 designates generally the frame of the harvester supported in elevated position upon a rear axle 6 having ground wheels 7, the front end of said frame having a mounting 8 for a vertical steering post 9, with its lower end attached to a front wheel assembly 10. The upper end of the post 9 is provided with a steering lever 11, by means of which the front wheel assembly may be steered for guiding the machine over the ground.

A pair of frame members 12 which serve as gatherer frames or arms are pivotally supported at their rear ends upon the rear axle 6, and disposed at opposite sides of the vehicle frame 5 and extend forwardly and downwardly at an inclined angle with each of said pivoted frame members being composed of a series of spaced parallel longitudinally extending strips 13, upon the upper surface of which is supported a tunnel-like member 14, having its forward end open, and with its upper portion inclined downwardly and rearwardly. The forward edge of the tunnel like members are provided with a reinforcing arch 15 and extend upwardly above the frame members 12 a sufficient distance to permit the entrance of the stalks of corn into the tunnel.

Adjacent the upper portion of each of the arch members 15 is the substantially transverse bar 16 and to which a plurality of single trees 17 are attached by means of a conventional type of draft equalizer 18.

A yoke 19 is also attached adjacent the upper portion of each of the arcuate members 15, each of said yokes having an expansible coil spring 20 attached thereto and connected with links 21 extending forwardly from a horizontally disposed rock shaft 22 journaled at the forward portion of the frame 5 and provided with an operating lever 23. It will be apparent that a quadrant 24 is associated with the lever for securing the same in a predetermined position, and by the manipulation of the lever, the forward end of the frame members 12 may be vertically adjusted. At each side of each of the tunnel members 14 is arranged a brace rod 25 extending rearwardly from a point adjacent the upper ends of the arch members 15 rearwardly and downwardly for attaching to one of the strips 13 forming the frame members 12.

A pair of skids 26 extend forwardly from each of the frame members or gathering arms 12 and are disposed in spaced substantially parallel relation as more clearly illustrated in Figure 7 of the drawings, with their outer ends diverging as shown at 27 to form guides for loose ears of corn lying upon the ground, and to also direct the stalks of corn between the center spaced strips 13 of the frame member 12.

At each side of the guide members 26 is an endless conveyor 28 or gathering mechanism constructed of stalk conveying chains 29, extended about the guide pulleys 30 mounted at the forward ends of the frame members 12 and operated by sprockets 31 mounted adjacent the rear ends of said frame members. The outer surface of each of the chains is provided with drags 32 for engaging the corn and the stalks as the same are fed through the side skids 26 for passing the same rearwardly in the tunnel as the machine moves forwardly.

Each of the gatherer arms or frames 12 is also provided with a rake 33 that extends outwardly and forwardly at an inclined angle from the forward edge of the frame member for directing loose ears of corn lying upon the ground toward the center of the machine for feeding into a position for engagement by the drags 32 of the conveyors.

As more clearly illustrated in Figures 5 and 6 of the drawings, the rakes are constructed of tines 34 having their lower ends bent horizontally and extended rearwardly as shown at 35. Braces 36 are provided for the rakes to maintain the same in a predetermined position with respect to the machine.

Each of the sprockets 31 at the rear ends of the conveyor chains are mounted upon substantially vertically disposed shafts 37, each of said shafts having spur gears 38 mounted adjacent their upper ends and with each of the gears carried by the respective frame members 12 disposed in operative engagement. The innermost shaft 37 of the frame members 12 are also provided with bevelled gears 40 operable by pinion gears 41, keyed upon a transversely extending shaft 42. The shaft 42 is also provided with a sprocket 43, operated by a chain 44, extended forwardly and upwardly about a sprocket 45, said last named sprocket being operated by a sprocket 46, mounted upon a shaft 47, journaled upon a shaft supporting frame 48, carried at the forward portion of the vehicle frame 5. The frame 48 also provides a mounting for a transversely extending shaft 49, upon which sprockets 50 and 51 respectively are mounted, the sprocket 50 being utilized to drive the sprocket 46 through a chain 52.

The shaft 49 is also provided with a bevelled gear 53 operatively engaged by a bevelled pinion gear 54 mounted at the forward end of a drive shaft 55. The drive shaft 55 extends forwardly from a motor 56 supported at the rear end of the frame 5. A corn sheller housing 57, is mounted adjacent the rear end of the machine within which is operatively positioned a corn sheller of conventional construction, such as, for example, a sheller of the usual type wherein the ears of corn coming in contact with the roller 58 on the right hand side thereof, looking at Fig. 12, are drawn in on the underside of the roller by means of spiral shaped vanes thereon, the ears on the left hand side being drawn into the sheller on the upper side of the roller 58 between the roller and the housing 57. The ears of corn are fed into the sheller housing 57 by means of a pair of oppositely extending troughs 59, which have their outer ends positioned for receiving the ears of corn from the upper ends of the conveyors 28.

Adjacent the upper ends of each of the conveyors is a pair of picker rollers 60, disposed in substantially closely spaced parallel relation and mounted upon shaft 61, extending longitudinally and supported upon brackets 62 disposed inwardly at the rear ends of the tunnels 14, and between which rollers the stalks will pass as the same reach the rear ends of the tunnels. Accordingly as the stalks are bent downwardly and forwardly through their engagement with the rearwardly inclined tops of the tunnels, the stalks will pass between the cooperating rollers 60 and result in removing the ears of corn from the stalk since said ears are unable to pass between the rollers.

The ears will then be deposited in the trough 59 for feeding into the sheller 58. Gears 63 are carried on the roller shaft 61, adjacent the rear ends of the rollers, disposed in engagement for rotating the rollers in opposite directions as indicated by the arrows shown in Figure 13 of the drawings. One of the shafts 61 of each pair of rollers extends rearwardly for attachment to a shaft extension 64 through a universal connection 65, said shaft extensions being provided with belt wheels 65ª, for operation by belts 66, from belt drive wheels 67, mounted upon a centrally disposed longitudinally extending shaft 68, with its forward end operatively connected by a chain and sprocket drive means 69, with the drive shaft 55. The shaft 68 extends through the corn sheller 58 for operating the sheller.

The motor 56 is enclosed within a hood 70 having its rear end open and adjacent the said open end is a fan 71 operated by the motor for forcing an air draft through a tunnel 72. The tunnel 72 extends forwardly and forms an enclosure for the corn sheller mechanism 58, and operates to blow the shelled corn, as well as the husks and cobs from the mouth 73 of the tunnel onto a conveyor 74.

The conveyor 74 is formed of a plurality of spaced parallel slats 75, having their ends secured in fixed relation to a pair of conveyor chains 76, operated by sprockets 77, and 78, respectively, said last named sprocket being driven by the sprocket 51 by a chain 79.

The conveyor 74 moves in a forward direction and is arranged with its slats 75 spaced apart sufficiently to permit the grains of corn to pass therethrough and to convey the shucks and cobs forwardly for discharge from the forward end of the conveyor upon the ground, immediately rearwardly of the front wheel assembly 10.

A shaker screen 80 is positioned beneath the conveyor 74 adjacent its rear end and is supported for horizontal swinging movement in a longitudinal direction upon forward and rearwardly disposed hangers 81 and 82 pivotally attached to a part of the frame. To the forward hanger 81 is pivotally attached one end of an operating rod 83 which extends upwardly for pivotally connecting to a rocker arm 84 having one end pivotally attached to the main frame 5. The rocker arm 84 is composed of a pair of spaced parallel sections between which a roller 85 is journalled for rotation. The roller is positioned for engagement by a pair of lugs 86 disposed eccentrically upon the sprocket wheel 50. The shaker screen 80 is adapted to be suspended in a slightly downwardly and rearwardly inclined position by providing the rear hanger 82 of a slightly greater length, the hangers being normally disposed perpendicularly by reason of the gravitation of the screen. Accordingly, as the pins 86 strike the rocker arm 84, the forward end of the shaker screen will be moved rearwardly to produce an agitation of the grains of corn deposited thereupon from the conveyor 74.

Thus all dirt and other foreign particles are removed from the grains of corn and permitted to sift through the screen 80 upon the ground. Beneath the rear end of the shaker screen 80 is positioned a trough 87 for receiving the grains of corn from the rear end of the screen for depositing the corn at the lower end of the conveyor 88 which extends upwardly at the rear of the machine and is provided with a flexible discharge chute 89 at its upper end for delivering the grains of corn to a vehicle at the rear of a harvester.

The conveyor 88 is of a conventional construction and arranged for operation by a chain and sprocket drive mechanism 90, operatively connected with the shaft extension 64.

It will be apparent from the foregoing that the harvester will be effective to gather all loose ears of corn from the ground and to remove the ears from the stalks and furthermore will operate to shell the corn, separate the grains from the shucks and the cob and to deliver the grains at the rear of the machine while the same is passing over the field.

It is obvious from the foregoing that various changes in the shape, size and arrangement of parts may be resorted to, without departing from the spirit of the invention or the scope of the appended claims.

I claim:

1. A harvester comprising in combination, a vehicle frame, a pair of gatherer frames disposed at opposite sides thereof, means for vertically adjusting the forward ends of the gatherer frames relative to the vehicle frame, gathering mechanism operatively carried by the gatherer frames, picking mechanism at one end of the gathering mechanism, a sheller positioned on the vehicle frame, means conveying the corn ears from the picking mechanism to the sheller, and means for discharging the shelled corn and the waste materials at opposite ends of the harvester.

2. A harvester comprising in combination, a vehicle frame, a pair of gatherer frames disposed at opposite sides thereof and pivotally connected therewith, means for vertically adjusting the forward ends of the gatherer frames, gathering mechanism operatively carried by the frames, picking mechanism at one end of the gathering mechanism, a sheller positioned for receiving the corn ears from the picking mechanism, means on the vehicle frame for supplying an air draft to the sheller, and means for discharging the shelled corn and the waste material from the harvester.

3. A harvester comprising in combination, a vehicle frame, a pair of gatherer frames disposed at opposite sides thereof, means for vertically adjusting the forward ends of the gatherer frames, gathering mechanism operatively carried by the gathering frames, picking mechanism at one end of the gatherer frames, a sheller positioned for receiving the corn ears from the picking mechanism, means for discharging an air draft to the sheller, a conveyor arranged for receiving the waste material from the sheller for discharging the same forwardly of the harvester, and a shaker screen adapted for receiving the grains of corn from the sheller and arranged for discharging the grains of corn at the rear of the screen.

4. A harvester comprising in combination, a vehicle frame, a pair of gatherer frames disposed at opposite sides thereof, means for vertically adjusting the forward ends of the gatherer frames, stalk conveying chains operatively carried by the gatherer frames, picking mechanism at one end of the gatherer frames, a sheller positioned for receiving the corn ears from the picking mechanism, means for discharging an air draft to the sheller, a conveyor arranged for receiving the waste material from the sheller for discharging the same forwardly of the harvester, a shaker screen adapted for receiving the grains of corn from the sheller, and means for discharging the corn at the rear of said screen, and means for agitating said screen.

5. A harvester comprising in combination, a vehicle frame, a pair of gatherer frames disposed at opposite sides thereof, means for vertically adjusting the forward ends of the gatherer frames, downwardly disposed gathering mechanism operatively carried by the frame, said gatherer frames including a pair of spaced parallel sections, ground skids carried at the forward ends of the frames and arranged in pairs for guiding stalks between the sections of the frame, rakes disposed outwardly of the sides of the frame for feeding loose ears of corn from the ground into position for engagement by the gathering mechanism, picking mechanism at the upper end of said gathering mechanism, a sheller positioned for receiving the corn ears from the picking mechanism, and means for discharging the shelled corn and waste material at opposite ends of the harvester.

6. A harvester comprising in combination, a vehicle frame, a pair of gatherer frames disposed at opposite sides thereof, means for vertically adjusting the forward ends of the gatherer frames, stalk conveying chains operatively carried by the frame, said gatherer frames including a pair of spaced parallel sections, ground skids carried at the forward ends of the frames and arranged in pairs for guiding stalks between the sections of the frame, rakes disposed outwardly of the sides of the frame for feeding loose ears of corn from the ground into position for engagement by said chains, picker rolls at one end of said chains, a sheller positioned for receiving the corn ears from picking rolls, means for supplying an air draft to the sheller, and means for discharging the shelled corn and the waste materials at the opposite ends of the harvester.

7. A harvester comprising in combination, a vehicle frame, a pair of gatherer frames disposed at opposite sides thereof, means for vertically adjusting the forward ends of the gatherer frames, gathering mechanism operatively carried by the frame, said gatherer frames including a pair of spaced parallel sections, ground skids carried at the forward ends of the frames and arranged in pairs for guiding stalks between the sections of the frame, rakes disposed outwardly of the sides of the frame for feeding loose ears of corn from the ground into position for engagement by the gathering mechanism, tunnels mounted upon said gatherer frames open at their forward ends and inclining downwardly toward their rear ends whereby to bend the stalks, picking rollers mounted at the rear ends of the tunnels for removing the ears from the stalks, a sheller position between the gatherer frames, troughs for feeding the corn ears from the picking rollers to the sheller, and means for discharging the shelled corn and waste material at opposite ends of the harvester.

8. A harvester comprising in combination, a vehicle frame, a pair of gatherer frames disposed at opposite sides thereof, means for vertically adjusting the forward ends of the gatherer frames, stalk conveying chains operatively carried by the frame, said gatherer frames including a pair of spaced parallel sections, ground skids carried at the forward ends of the frames and arranged in pairs for guiding stalks between the sections of the frame for feeding loose ears of corn from the ground into position for engagement by said chains, tunnels mounted upon said conveyor frames open at their forward ends and inclining downwardly toward their rear ends whereby to bend the stalks, picking rollers mounted at the rear ends of the tunnels for removing the ears from the stalks, a sheller positioned between the gathering frames, troughs for feeding the corn ears from the rollers to the sheller, means for supplying an air draft to the sheller, a conveyor arranged for receiving the waste material from the sheller, and discharging the same forwardly of the harvester, and a shaker screen adapted for receiving the grains of corn from the sheller and arranged for discharging the corn at the rear of the said screen.

9. In a corn harvester of the class described, a frame, supporting wheels for the frame, corn picking mechanism on said frame adapted to remove the ears of corn from the standing stalks, corn husking and shelling mechanism carried by the frame, conveyor means adapted to convey the ears of corn from the picking mechanism to the husking and shelling mechanism, means to convey the shelled corn from the husking and shelling mechanism, and driving means for the picking and the husking and shelling mechanisms.

10. In a corn harvester, the combination of a frame, supporting wheels for the frame, two-row corn picking mechanism having stalk guiding means on the frame and comprising a pair of picker units, husking and shelling mechanism in operative association with said picking mechanism to receive the ears of corn therefrom and also mounted on said frame between said units, conveyor means to receive the shelled corn, and separate conveyor means to receive the husks and cobs.

11. In a corn harvester, the combination of a frame, supporting wheels for the frame, means to remove the ears of corn from the standing stalks, sheller means to husk and shell the ears of corn, means to clean and separate the same including a conveyor operating longitudinally of the harvester to convey both husks and cobs away from the sheller, and means to deliver the shelled corn to a point spaced from the cleaning and separating means.

12. In a corn harvester, the combination of a frame, supporting wheels for the frame, corn gathering means at opposite sides of the frame, each including forwardly extending gathering arms independently movable relative to the frame, stalk conveying chains and picker rolls, husking and shelling mechanism carried substantially centrally of said frame, means to direct ears of corn from the picker rolls to the husking and shelling mechanism, means to direct the husks and cobs from the last mentioned mechanism to deposit the same upon the ground, and conveyor means including an elevator to receive the shelled corn and direct its discharge from the harvester.

13. In a corn harvester, the combination of a frame, supporting wheels therefor, corn gathering means each including forwardly extending arms, stalk guiding chains, sprocket means driving the chains and picker rolls to remove the ears of corn from the stalks, a sheller including husking and shelling mechanism carried by the frame, trough means to direct the ears of corn from the picker rolls to the sheller, forwardly extending conveyor means to receive the shelled corn, husks and cobs from the sheller, said conveyor means including perforate sections to allow the shelled corn to pass therethrough, means to intercept the corn and convey the same rearwardly, and elevator means to elevate the shelled corn and deposit the same in position to be received by a container.

14. In a corn harvester, the combination of a frame, supporting wheels therefor, corn gathering means each including forwardly extending arms, stalk guiding chains, sprocket means driving the chains and picker rolls to remove the ears of corn from the stalks, means resiliently supporting the forward end of the corn gathering means in adjusted position on the frame, a prime mover carried on the frame, a power shaft driven thereby and journaled on the frame, a sheller including husking and shelling mechanism carried by the frame, trough means to direct the ears of corn from the picker rolls to the sheller, forwardly extending conveyor means to receive the shelled corn, husks and cobs from the sheller, said conveyor means including perforate sections to allow the shelled corn to pass therethrough, means to intercept the corn and convey the same rearwardly, elevator means to elevate the shelled corn and deposit the same in position to be received by a container, and power transmitting means connecting said shaft with the sheller, sprocket means, picker rolls, conveyor means and elevator means.

15. A machine of the class described comprising a wheeled frame, a pair of corn picker units pivotally supported on the frame, means to adjust the position of the units relative to the frame, each of said units including picker rolls and stalk conveying chains operatively arranged to guide stalks to pass between said rolls, a corn sheller unit including husker means mounted on the frame between the picker units, means extending transversely of the machine and arranged to receive the ears of corn removed from the stalks by the picker rolls and to deliver the ears to the sheller unit, and means to drive the sheller unit and picker units simultaneously.

16. A machine of the class described comprising a wheeled frame, a pair of corn picker units pivotally supported on the frame, means to adjust the position of the units relative to the frame, each of said units including picker rolls and stalk conveying chains operatively arranged to guide stalks to pass between said rolls, a transverse shaft carried by the frame and operatively connected to drive the stalk conveying chains of each corn picker unit, a corn sheller unit including husker means mounted on the frame between the picker units and arranged to receive the ears of corn removed from the stalks by the picker rolls, conveyor means to remove the shelled corn from the sheller unit, a longitudinal power driven shaft journaled on the frame, connections between the longitudinal shaft and the transverse shaft whereby the stalk conveying chains are driven, separate connections between the longitudinal shaft and the sheller unit to drive the latter from the former, said separate connections including a shaft extending longitudinally of the frame, and power transmitting means connecting the last mentioned shaft with the picker rolls to operate the same.

17. A machine of the class described comprising a wheeled frame, a pair of corn picker units pivotally supported on the frame, means to adjust the position of the units relative to the frame, each of said units including picker rolls and stalk conveying chains operatively arranged to guide stalks to pass between said rolls, a transverse shaft carried by the frame and operatively connected to drive the stalk conveying chains of each corn picker unit, a corn sheller unit including husker means mounted on the frame between the picker units and arranged to receive the ears of corn removed from the stalks by the picker rolls, conveyor means to remove the shelled corn from the sheller unit, a longitudinal power driven shaft journaled on the frame, connections between the longitudinal shaft and the transverse shaft whereby the stalk conveying chains are driven, separate connections between the longitudinal shaft and the sheller unit to drive the latter from the former, said separate connections including a shaft extending longitudinally of the frame, and power transmitting means connecting the last mentioned shaft with the picker rolls to operate the same, said last mentioned means including flexible connections so that the picker rolls may be driven in any of its adjusted positions.

18. In a machine of the class described, a wheel supported frame, corn picker mechanism carried by the frame and including picker rolls and stalk feeding means, means to control the position of the picker mechanism relative to the ground, and nonrotatable laterally extending means to guide loose ears of corn on the ground toward said feeding means.

19. A machine of the class described comprising a wheeled frame, a pair of corn picker units pivotally supported on the frame, means to adjust the position of the units relative to the frame, each of said units including picker rolls, stalk conveying chains to guide the stalks toward the picker rolls and means to incline the stalks downwardly and forwardly as they pass through the picker rolls, said means including upwardly extending arches near the forward portion of the picker units, a rearwardly and downwardly inclined hood and brace means supporting the arches in position, said picker unit adjusting means being connected to the arches, a corn sheller unit including husker means mounted on the frame between the picker units and arranged to receive the ears of corn removed from the stalks by the picker rolls, and means to drive the sheller unit and picker units simultaneously.

20. In a machine of the class described, a substantially rectangular frame having fore and aft extending members, supporting wheels including an axle supporting the rear end of the frame, a supporting wheel near the forward end of the frame, a pair of corn picker units, one on each side of the frame and each pivoted to rock about an axis coincidental with the axis of said axle, means including a crank carrying shaft connected with the forward ends of the picker units for controlling their rocking movement, and means to drive the picker units.

21. In a machine of the class described, a fore and aft extending frame, supporting wheels including a transverse axle intermediate the ends of the frame and extending laterally and outwardly therefrom, a corn picker unit pivotally connected with and extending forwardly of the outer ends of the axle and adapted to remove the ears from the standing stalks as the machine is moved therealong, means to drive the mechanism of the corn picker including a motor mounted on the frame rearwardly of the axle and connections therefrom to the picker mechanism, and means at the front of the frame to steer the machine.

22. A corn harvester comprising, in combination, a substantially rectangular frame comprising a plurality of fore and aft extending members and transverse connecting members therebetween, supporting wheels for said frame, an axle therefor spaced nearer one end of the frame than the other, a steering wheel supporting the other end of the frame, a vertical spindle therefor journaled on the frame, steering means connected with the spindle, a corn picker unit on each side of the frame but adjacent thereto and journaled near one end on the axle for up and down movement, manually operable lever and segment means mounted on the frame near the front end thereof and connected to control the up and down movement of the picker units, raker means at the forward end of the units to collect loose ears of corn on the ground, each of said units comprising a plurality of stalk guiding chains having lugs thereon, sprocket means to drive each of the chains and means to drive the chains of each unit simultaneously, a transverse shaft journaled on the frame and having gear connections with the last mentioned means, a motor on the frame mounted rearwardly of said axle, and operative connections between the motor and the transverse shaft.

23. A corn harvester comprising, in combination, a substantially rectangular frame comprising a plurality of upper and lower fore and aft extending members and transverse connecting members therebetween, supporting wheels for said frame, an axle therefor spaced nearer one end of the frame than the other, a steering wheel supporting the other end of the frame, a vertical spindle therefor journaled on the frame, steering means connected with the spindle, a corn picker unit on each side of the frame but adjacent thereto and journaled near one end on the axle for up and down movement, manually operable lever and segment means mounted on the frame and connected to control the up and down movement of the picker units, each of said units comprising a plurality of stalk guiding chains having lugs thereon, sprocket means to drive the chains of each unit simultaneously, a transverse shaft journaled on the picker units and having gear connections with the last mentioned means, a motor mounted on one end of the upper of said fore and aft extending frame members, a longitudinally extending power shaft driven thereby and journaled in said last mentioned members, a transverse shaft journaled on said last mentioned members and having a bevel gear connection with the power shaft, and operative connections between the two transverse shafts.

24. A corn harvester comprising, in combination, a frame, supporting wheels therefor, corn picker units pivotally carried by the frame, and hitch means connected with the forward ends of said units.

25. A corn harvester comprising, in combination, a frame, supporting means for the frame including an axle and wheels journaled thereon, picker means carried by the frame and adapted to remove ears of corn from the stalks, sheller means on the frame disposed in a fore and aft direction with respect to said axle and adapted to shell the ears of corn removed by the picker means, and a source of power carried by said frame disposed on the other side of said axle from said sheller means and adapted to drive both the sheller means and said picker means.

26. A corn harvester comprising, in combination, a frame supporting means therefor comprising an axle and wheels journaled thereon for supporting at least a portion of said frame, picker means carried by the frame and adapted for independent movement relative to the frame, said picker means being adapted to remove ears of corn from the stalks, sheller means mounted on the frame forward of said axle and adapted to shell the ears of corn removed by the picker means, a source of power also carried by the frame and disposed rearwardly of said axle, and driving connections between said source of power and both the sheller means and said picker means.

27. A corn harvester comprising, in combination, a frame, supporting means for the rear of the frame including a rear axle and wheels journaled thereon, said axle extending laterally at one side of said frame, picker means to remove ears of corn from the stalks, means pivotally supporting said picker means on the extended end of said axle for vertical movement relative to said frame, sheller means disposed on said frame in fore and aft spaced relation with respect to said axle, means conveying the picked ears of corn from said picker means to said sheller, a source of power carried by said frame and disposed on the opposite side of said axle, and driving connections between said source of power and both the sheller and picker means.

28. A corn harvester comprising, in combination, a supporting frame, relatively movable picker units disposed at opposite sides of said frame, said picker units each including snapping rolls, and sheller means carried by said frame and disposed thereon between said picker units and adjacent the snapping rolls thereof.

29. A corn harvester comprising, in combination, a supporting frame, a picker unit carried by the frame at opposite sides thereof, each picker unit including a pair of snapping rolls, sheller means carried by said frame between said units and adjacent the snapping rolls, and transversely extending means leading from the rolls of each unit directly to said sheller to direct the snapped ears of corn to said sheller.

30. A corn harvester comprising, in combination, a frame, supporting means for the frame, a picker unit disposed at each side of said frame, each of said picker units including longitudinally disposed snapping rolls and a longitudinal drive shaft therefor, a sheller unit carried by said frame and disposed between said picker units, a longitudinally disposed drive shaft for said sheller unit, and a source of power carried by said frame and operatively connected to drive said longitudinal shafts.

31. A corn harvester comprising, in combination, a supporting frame, a picker unit disposed at each side of said frame and each including a pair of snapping rolls and a longitudinal drive shaft therefor, a sheller unit disposed on said frame substantially midway between the snapping rolls of said units, a longitudinal drive shaft for said sheller unit, a source of power carried by said frame and disposed rearwardly of said sheller and picker units, and operative driving connections between said source of power and said longitudinal shafts.

32. A corn harvester comprising, in combination, a supporting frame, a picker unit disposed at each side of said frame and pivotally mounted for vertical movement about an axis near the rear end of said frame, each of said picker units including a pair of snapping rolls and gatherer chains therefor, interconnected gear means driving the gatherer chains of each pair, means for simultaneously driving said interconnected gear means comprising a bevel gear associated with each of said interconnected gear means and a transverse shaft having a pinion at each end meshing with the associated bevel gear, and means for driving said transverse shaft including operating connections extending therefrom a substantial distance longitudinally of the frame.

33. A corn harvester comprising, in combination, a longitudinally disposed supporting frame, a picker unit carried at each side of said frame and movable vertically about a transverse axis at the rear end of said frame, each of said picker units including a pair of snapping rolls and gatherer chains to convey the stalks of corn to said rolls, driving means for each pair of said rolls including a longitudinally disposed driving shaft having a universal joint to permit of said vertical movement, a sheller unit disposed on said frame between said snapping rolls, a longitudinal drive shaft for said sheller unit journaled on said frame, a source of power carried by said frame and operatively connected to drive all of said longitudinal drive shafts, means for driving the gatherer chains of each unit including interconnected gear means, and means for simultaneously driving said interconnected gear means including a transverse shaft operatively connected with said source of power.

34. A corn harvester comprising, in combination, a longitudinal frame, supporting wheels for the frame, a picker unit carried at each side of said frame and pivotally mounted for vertical movement about axis at the rear of said frame, each of said units including a pair of snapping rolls connected to rotate in opposite directions, means for driving the rolls of each pair including a longitudinal shaft connected with one of the rolls of each pair by means of a universal joint, a pair of gatherer chains for each of said picker units, means for driving the gatherer chains including interconnected gear driven sprockets, means including a transverse shaft for simultaneously driving the sprockets of each pair of gatherer chains, a source of power carried by said frame, a centrally disposed drive shaft operatively connected with the longitudinal shafts of the picker units, and separate means for driving said transverse shaft from said source of power including driving connections extending for a substantial distance in a generally longitudinal direction with respect to the axis about which said picker units are vertically movable.

35. An agricultural machine comprising a generally longitudinally disposed frame, supporting means therefor, a pair of corn picker units, one arranged on each side of the frame and each unit being pivoted to rock about a horizontal axis adjacent the rear end of the frame, each of said corn picker units including forwardly and downwardly inclined snapping rolls, laterally inwardly disposed means carried by the frame and adapted to receive the snapped ears of corn, and an operating mechanism carried by said frame between said units and including a rotatable roller arranged to receive at its rear end the ears of corn from said laterally inwardly disposed means, the roller extending forwardly in a generally longitudinal direction with respect to said frame.

36. An agricultural machine comprising a generally longitudinally disposed frame, an operating unit carried at each side of said frame and extending in a generally longitudinal direction, laterally inwardly directed means extending inwardly from each of said units and adapted to receive the discharge therefrom and to direct the same laterally inwardly, an operating mechanism carried by said frame and adapted to receive the discharge from said last mentioned means, said operating unit being disposed with its rear end adjacent the inner ends of said means and extending forwardly therefrom, and longitudinally operating conveyor means mounted on the frame and disposed to receive the discharge from said operating mechanism.

37. An agricultural machine comprising a generally longitudinally disposed frame, an operating unit carried at each side of said frame and extending in a generally longitudinal direction, laterally inwardly directed means extending inwardly from each of said units and adapted to receive the discharge therefrom and to direct the same laterally inwardly, and an operating mechanism carried by said frame and adapted to receive the discharge from said last mentioned means, said operating mechanism being disposed with its rear end adjacent the inner ends of said means and extending forwardly therefrom.

38. An agricultural machine comprising, in combination, a generally longitudinally disposed frame, a pair of operating units arranged at either side of said frame and extending forwardly with respect thereto, and means for applying draft to the forward ends of the said operating units comprising transversely extending draft means operatively connected with the forward ends of each of said units.

39. An agricultural machine comprising a longitudinally disposed frame, an operating unit carried at each side of said frame and extending forwardly thereof, and means for applying draft to the forward ends of said operating units comprising a transverse draft bar connected to the forward ends of said units and means for applying draft to said bar.

40. An agricultural machine comprising a generally longitudinally disposed frame, a pair of operating units, one disposed at each side of said frame and extending longitudinally thereof, an operating mechanism carried by said frame between said units and arranged to receive the discharge from both of said units, and means for applying draft to said units and through the units to said frame, said means comprising a transverse draft bar directly connected with the front ends of said units and means for applying draft to said bar.

41. An agricultural machine comprising, in combination, a generally longitudinally disposed frame, a pair of operating units arranged at either side of said frame and independenty movable relative to the frame, and means for applying draft to the forward ends of the said operating units comprising transversely extending draft means operatively connected with the forward ends of each of said units.

42. An agricultural machine comprising a generally longitudinally disposed frame, an operating unit carried at each side of said frame and shiftable with respect thereto, laterally inwardly directed means extending inwardly from each of said units and adapted to receive the discharge therefrom and to direct the same laterally inwardly, an operating mechanism carried by said frame and adapted to receive the discharge from said last mentioned means, said operating unit being disposed with its rear end adjacent the inner ends of said means and extending forwardly therefrom, and longitudinally operating conveyor means mounted on the frame and disposed to receive the discharge from said operating mechanism.

43. An agricultural machine comprising a generally longitudinally disposed frame, an operating unit carried at each side of said frame and vertically adjustable with respect thereto, laterally inwardly directed means also carried by the frame and extending inwardly from each of said units and adapted to receive the discharge therefrom and to direct the same laterally inwardly, and an operating mechanism carried by said frame and adapted to receive the discharge from said last mentioned means, said operating mechanism being disposed with its rear end adjacent the inner ends of said means and extending forwardly therefrom.

LONDELL CAMERON FORREST.